Nov. 13, 1951     A. R. MADILL     2,575,223
SUPPORTING AND DRIVING STRUCTURE FOR
ROTARY TILLING TINES AND THE LIKE
Filed April 24, 1948     2 SHEETS—SHEET 1
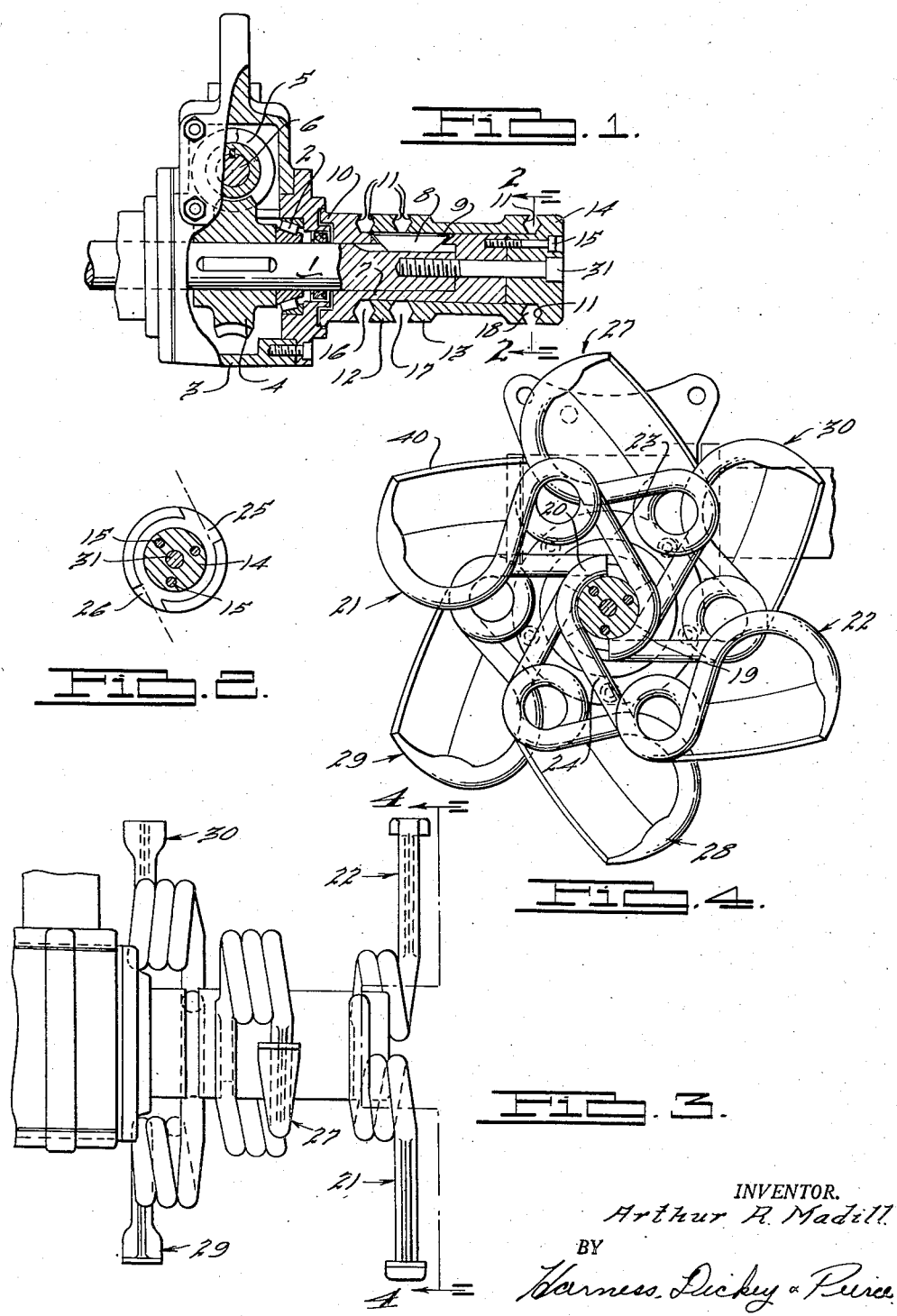
INVENTOR.
Arthur R. Madill
BY
Harness, Dickey & Pierce
ATTORNEYS

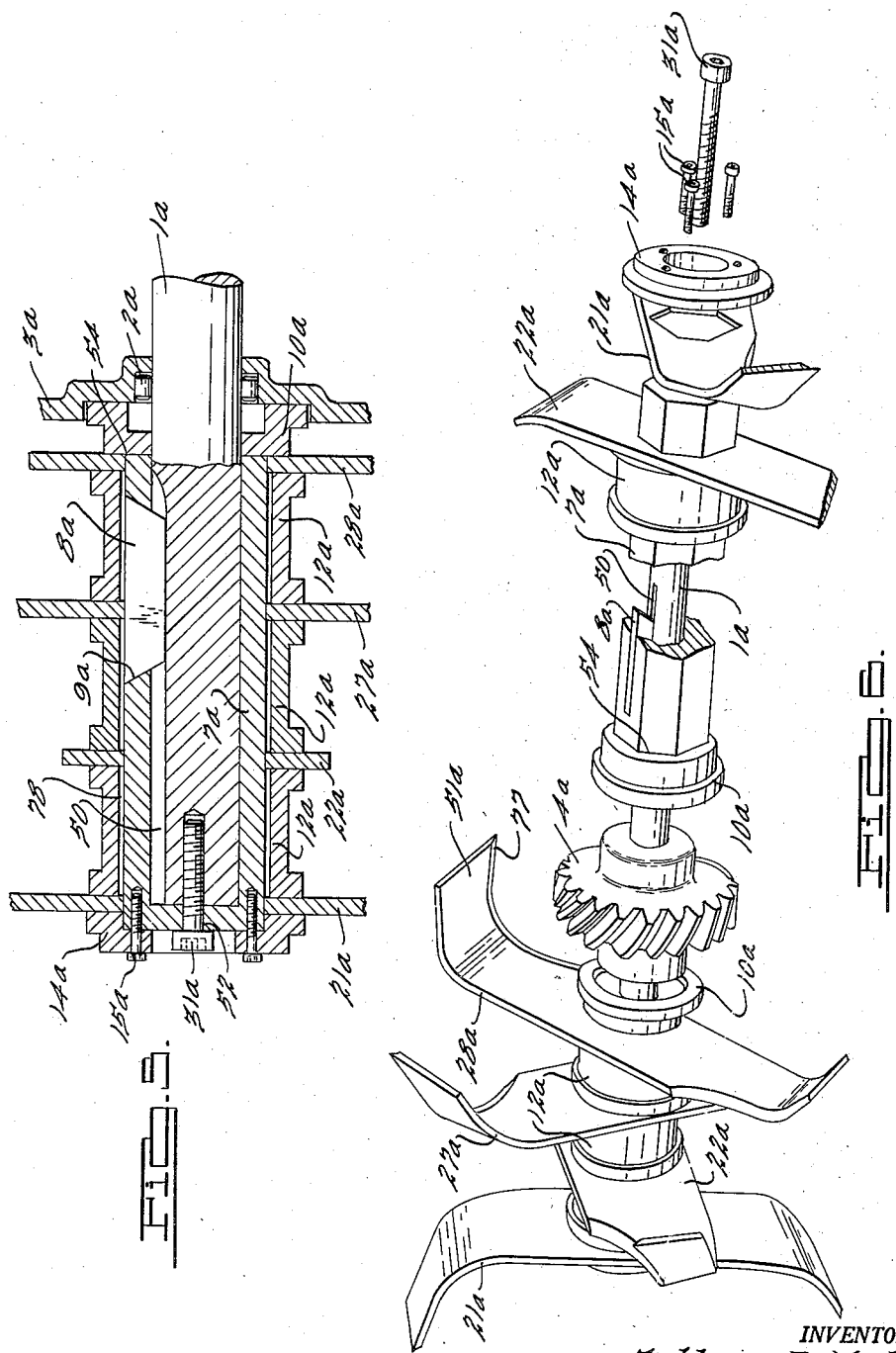

Patented Nov. 13, 1951

2,575,223

UNITED STATES PATENT OFFICE 2,575,223

SUPPORTING AND DRIVING STRUCTURE FOR ROTARY TILLING TINES AND THE LIKE

Arthur R. Madill, Detroit, Mich., assignor, by mesne assignments, to Delazon E. Mead, doing business as Mulsifier Implement Company, Detroit, Mich.

Application April 24, 1948, Serial No. 23,055

14 Claims. (Cl. 97—216)

1

The present invention relates to the construction of power operated rotary agricultural cultivators or tilling machines and particularly to the digging or tilling mechanisms thereof. This application constitutes a continuation-in-part of the applicant's copending applications, Serial Nos. 626,794 and 695,246, filed November 5, 1945, and September 6, 1946, respectively, now both abandoned.

The principal object of the invention may be stated generally to comprehend the provision of improved mounting means for securing rotary tilling tines to the driving mechanism of machines of the indicated character.

Another and more specific object of the invention is to provide such improved tine supporting and driving means which permits quick and simple installation and removal of the tilling tines for servicing, sharpening and/or replacement or to enable changing the number or arrangement of the tilling tines in accordance with the type of soil to be worked.

Still another object is to provide such tine supporting and driving means which is simple and inexpensive of construction but extremely rugged and reliable in operation, and which contains no parts apt to become fouled with weeds, stalks, or roots.

Other objects and advantages will be apparent upon consideration of the present disclosure in its entirety.

In the drawing:

Figure 1 is a partial section taken longitudinally through the transverse tilling shaft of a rotary tilling machine, with the tines removed to show the attaching mechanism, a part of the structure being shown in elevation.

Figure 2 is a fragmentary section taken on the line 2—2 of Figure 1;

Figure 3 is a fragmentary plan view of the rotary tilling shaft of Figure 1, showing the tilling tines mounted thereon;

Figure 4 is a view taken on the line 4—4 of Figure 3;

Figure 5 is a view corresponding to Figure 1 but showing a modified construction; and Figure 6 is a perspective view, partially exploded and broken away, of the modified construction.

The present invention relates to the type of power driven rotary tilling machine which employs a power driven tilling shaft equipped with a plurality of digging tines and extending parallel to the ground level and transverse to the direction of travel of the machine. The tilling shaft is rotated in the direction of travel by a suitable source of power to effect the tilling operation. The machine may be either mounted upon or drawn by a tractor on which the operator rides or may be of the so-called "walking" type in which the operator walks behind the unit and guides its path of operation, in accordance with conventional practice. For further details of the construction of a suitable machine of the latter type, reference may be had to applicant's aforementioned copending application, Serial No. 626,794.

Insofar as the present application is concerned, it is sufficient to note that the machine includes a transverse tilling shaft 1 which is journaled by means of suitable bearings 2 in a housing 3 and projects at either end from the housing to receive two sets of tilling tines. Within the housing the shaft is provided with suitable drive means such as the illustrated worm wheel 4 which meshes with the worm 5 on a power driven shaft 6. Any suitable means may be provided for driving the shaft 6 from a source of motive power.

Since the arrangement of the tines at each side of the housing 3 is identical, only the mechanism at one side is illustrated. As shown in Figure 1, the right-hand projecting end of the shaft 1 receives a sleeve or quill 7 which is connected to the shaft by means of a key 8. The key slot 9 in the sleeve extends entirely through the sleeve so that the key may be inserted after the sleeve is installed. However, for reasons hereinafter pointed out, the sleeve may be removed from the shaft with the complete assembly of tines in which event the key will remain in the slot of the sleeve so that the complete assembly can be reinstalled on the shaft. The inner end of sleeve 7 is provided with a flange 10 which forms a shallow axially opening angular channel 11. A pair of annular rings 12 and 13 is slidably mounted on the sleeve 7, and each end of the annular members 12 and 13 is provided with a similar axially opening channel 11.

After the annular members 12 and 13 are installed on the sleeve 7, a retaining head 14, having a similar inwardly opening channel formed adjacent its periphery, is fixed to the end of the sleeve 7 in any suitable manner, as by means of cap screws 15. As a result of this arrangement, there are provided three annular generally toroidal spaces 16, 17 and 18 for the reception of the terminal portions of the tines. As best shown in Figure 4, the terminal portions 19 and 20 of the two outermost tines 21 and 22, respectively, are curved to wrap around the head 14 within the space 18, and the outer edges of the annular recesses which form the space 18 partially overlap the peripheries of the terminal portions to retain the tines against displacement. Tine 21 has a straight shank portion 23 which extends tangentially with respect to the terminal portion 19, and tine 22 has a similarly arranged shank portion 24. As best shown in Figure 2, the outer edges or flanges of the annular recesses 11 in the right-hand end of sleeve 13 are notched out at 25 and 26 to permit the tangential projection of the shank portions 23 and 24 from the space 18. The annular recess 11 in the head 14 is similarly notched.

The annular space 17 similarly receives identical pairs of tines 27 and 28, while the annular space 16 receives a pair of tines 29 and 30. However, it will be noted that the terminal portions of tines 27, 28, 29 and 30 wrap around sleeve 13, rather than head 14. The tines of each pair project in opposite directions from the sleeve 13, and the respective pairs of tines are displaced angularly with respect to each other so that only one or two tines of the group of six will be engaging the soil at one time. After the curved terminal portions of the six tines are located within the spaces 16, 17 and 18 and their angular positions shifted to correspond to the locations of the notches, such as notches 25 and 26 of Figure 2, the cap screws 15 may be tightened to clamp the entire assembly of tines and the rings 12 and 13 against the flange 19 of sleeve 7. This locks all six of the tines against angular and axial displacement with respect to the sleeve.

The entire assembly is secured to the shaft 1 by means of a cap screw 31 which passes through the head 14 and the closed outer end of the sleeve 7. As a result of this arrangement, the sleeve 7, together with the head 14 and all of the tine retaining rings, may be removed from the shaft 1 as a single unit by simply removing the cap screw 31. In that event, the key 8 is retained in the slot 9 by reason of engagement of the tapered ends of the key with the correspondingly tapered ends of the slot 9.

As described in the aforementioned copending application, Serial No. 695,246, now abandoned, the tines 21, 22, 27, 28, 29 and 30 are formed of heavy resilient wire stock helically coiled intermediate the ends thereof to provide a spring permitting yielding and deflection of their outer, digging ends and are also preferably provided with blades as 40 which serve as cutting means as well as guards preventing the hooked tines from catching beneath stones or other heavy objects or beneath pipes, roots, or the like.

In Figures 5 and 6, I have shown a modified construction employing blade-type tines so arranged and supported that either the individual tines of a completely assembled group of tines may be removed and replaced with extreme ease and convenience. Figure 5 illustrates sectionally only one end of the tine supporting and driving shaft, the driving gear and related portions also being omitted from this view, although it will be appreciated that such driving means may correspond to the driving gear, housing and supporting structure illustrated in Figure 1. In Figure 5, such driving portions would be at the right, however, since the left end of the shaft is illustrated, as the parts are viewed in the drawing, and it will also be understood that an equivalent and generally symmetrical right-hand extremity, carrying similar tines, would preferably be employed. In this embodiment, parts analogous to parts already described are designated by like reference characters distinguished by the addition of the letter $a$ to each.

Shaft $1a$ is similarly provided with a longitudinally keyway as $50$ and a quill $7a$ having a closed outer end is fitted over shaft $1a$ and keyed thereto as by means of the tapered key $8a$, the key $8a$ being fitted in a conformably tapered slot $9a$ which extends radially through the wall of the quill $7a$ and is of such length as to allow the key $8a$ to protect radially inwardly from the quill and into the keyway $50$; although when the quill is removed from the shaft, the key cannot fall through the slot $9a$ into the interior of the quill. Shaft $1a$ is axially drilled and tapped at its end to receive a retaining cap screw $31a$ for the quill, which extends through a suitable axial opening as $52$ in the closed end of the quill to firmly retain the quill upon the shaft. Externally the quill $7a$ is of noncircular cross section and may conveniently be formed hexagonal, as indicated in Figure 6.

At its inner extremity closest to the side wall of the housing structure $3a$, the quill $7a$ carries a guard flange shown as a separately formed cupped element $10a$ welded or otherwise rigidly secured to the inner extremity or open end of the quill, as indicated as $54$. It will be appreciated that flange portions $10$ may fit relatively closely against although it is freely rotatable with respect to the wall $3a$ and may serve as a guard for the antifriction shaft bearing $2a$. Flange member $10a$ is of somewhat greater diameter than quill $7a$, at least as to the minimum dimension of the latter, and serves as a retaining shoulder for the tilling tines and spacer members.

The tilling tines comprise bladelike metal members $21a$, $22a$, $27a$, $28a$. Each such blade is provided with a hexagonal central opening which fits easily upon and holds the blade against rotation with respect to the hexagonal quill $7a$, the blades having diametrically opposed projecting arms and being laterally bent at their ends as indicated at $51a$ to provide digging portions adapted to facilitate breaking up the earth. The ground engaging edges of the tine blades may be sharpened, as indicated at $77$, although I have found that if the blades are not more than approximately one-eighth inch in thickness, the abrasive action of dirt, stones, and worked material will tend to round the working edges about a small enough radius to impart to the blades an effective cutting action. Tine blade $28a$ is indicated as fitted closely against the shoulder cup $10a$, and blades $27a$, $22a$ and $21a$ are serially arranged in the order named each progressively closer to the outer end of the assembly. Spoollike spacer blocks as $12a$ are interposed between each pair of blades. The spacer blocks are shown as alike in construction and dimensioning, although it will be appreciated that their size may be varied if it is desired to vary the spacing of the tines. The spacer blocks may have round axial openings therethrough, as indicated at $78$, the diameter of which somewhat exceeds the maximum diameter of the hexagonal quill $7a$, so that the spacer blocks may readily be slid thereover. The outermost tine blade $21a$ is retained by a cap $14a$ overlying the same and held thereagainst and upon the end of the quill $7a$ by screws $15a$ which extend through the cap and into the sleeve. The parts are so proportioned that when the screws $15a$ are tightened, the blades and spacer blocks are tightly clamped together and rigidly held between cap 14a and the inner flange portion 10a.

If desired, as indicated in Figure 6, the laterally extending digging portions 51a of the tine blades may be turned in opposite directions. It will be recognized that the blade arrangement may readily be changed by turning individual blades so that their ends project in either direction, placing them in pairs back-to-back or otherwise varying their disposition, and that by removing the screws 15a and cap 14a individual blades may readily be removed and changed. When it is desired to remove the complete assembly of all tines as a unit, this may readily be done by removing the cap screw 31a and sliding the quill 7a from the shaft 1a without disassembling the parts mounted upon the quill. When the complete assembly is removed in the indicated manner, the key 8a remains in position with respect to the sleeve, being held against outward escape by the spacer blocks and tine blades, and held against inward displacement by the tapering contour of the key and its slot 9a.

While it will be apparent that the preferred embodiments of the invention herein disclosed are well adapted to fulfill the objects and advantages first above stated, it will be appreciated that the invention is susceptible to variation, modification, and change without departing from the proper and intended scope of the subjoined claims.

I claim:

1. Means for supporting and driving rotary tilling tines from the power shaft of rotary tilling machines and the like comprising a quill adapted to fit over and to be secured to rotate as a unit with such a shaft, a plurality of tines fitted over said quill and keyed thereto, spacing and securing elements for removably holding said tines upon said quill and against unwanted movement with respect to one another, and keying means carried by and projecting inwardly from said quill, and extending radially entirely through the same to the exterior thereof, said keying means being blocked against outward dislodgement by said tines and spacing elements.

2. Means for supporting and driving rotary tilling tines from the power shaft of rotary tilling machines and the like comprising a quill adapted to fit over and to be secured to rotate as a unit with such a shaft, a plurality of tines fitted over said quill and keyed thereto, spacing and securing elements for removably holding said tines upon said quill and against unwanted movement with respect to one another, and end abutment elements carried by opposite extremities of and projecting radially outwardly from said quill to retain such tines, and spacing elements thereupon, at least one of said end abutment elements being detachably secured to the quill.

3. Means for supporting and driving rotary tilling tines from the power shaft of rotary tilling machines and the like comprising a quill adapted to fit over and to be secured to rotate as a unit with such a shaft, a plurality of tines fitted over said quill and keyed thereto, spacing and securing elements for removably holding said tines upon said quill and against unwanted movement with respect to one another, said quill being provided with an end wall adapted to overlie the end of the shaft, and means extending through said end wall and adapted to engage said shaft to secure the quill assembly with respect to the shaft.

4. Means for supporting and driving rotary tilling tines from the power shaft of rotary tilling machines and the like comprising a quill adapted to fit over and to be secured to rotate as a unit with such a shaft, a plurality of tines fitted over said quill and keyed thereto, spacing and securing elements for removably holding said tines upon said quill and against unwanted movement with respect to one another, end abutment elements carried by opposite extremities of and projecting radially outwardly from said quill to retain such tines and spacing elements thereupon, one of said end abutment elements being detachably secured to the quill, said quill having an end wall upon the same end as the removable abutment element adapted to overlie the end of the shaft, and means extending through said end wall and adapted to engage said shaft to secure the quill assembly with respect to the shaft.

5. A rotary tilling implement including a rotary shaft, a plurality of axially spaced tines having terminal portions curved to wrap partially around said shaft, and means including a spacing and retaining ring intermediate axially spaced tines, and clamping abutment portions engageable with opposed outer surfaces of tines lying on opposite sides of said ring for clamping the terminal portions of the tines in position on the shaft.

6. A rotary tilling implement including a rotary shaft, a tilling tine having a shank provided with a terminal portion adapted to wrap partially around said shaft, means fixed to the shaft defining an axially opening annular recess adapted to receive said terminal portion, the outer wall of said recess being in the form of a flange overlapping the outer periphery of said terminal portion, a portion of said flange being cut away to receive said shank, and means to clamp the tine axially in said recess.

7. A rotary tilling implement including a rotary shaft, a tiling tine having a shank provided with a terminal portion adapted to wrap partially around said shaft, means slidably mounted on the shaft defining an axially opening annular recess adapted to receive said terminal portion, the outer wall of said recess being in the form of a flange overlapping the outer periphery of said terminal portion, a portion of said flange being cut away to receive said shank, means to clamp the tine axially in said recess, and means to fix said first-mentioned means against rotation with respect to the shaft.

8. A rotary tilling implement including a rotary shaft, a pair of tilling tines each having a shank provided with a terminal portion adapted to wrap partially around said shaft, means fixed to the shaft defining an axially opening annular recess adapted to receive said terminal portions with the shanks of the tines projecting from the shaft in opposite directions, the outer wall of said recess being in the form of a flange overlapping the outer periphery of said terminal portions, portions of said flange being cut away to receive the shanks of said tines, and means to clamp the tines axially in said recess.

9. A rotary tilling implement including a rotary shaft, a pair of tiling tines each having a shank provided with a terminal portion adapted to wrap partially around said shaft, means slidably mounted on the shaft defining an axially opening annular recess adapted to receive said terminal portions with the shanks of the tines projecting from the shaft in opposite directions, the outer wall of said recess being in the form of a flange overlapping the outer periphery of said terminal portions, portions of said flange being cut away to receive the shanks of said tines, means to clamp the tine axially in said recess, and means to fix said first-mentioned means against rotation with respect to the shaft.

10. A rotary tilling implement including a rotary shaft, a plurality of tilling tines each having a shank provided with a terminal portion curved to wrap at least partially around said shaft, means to fix said tines to said shaft in axially spaced relation to each other including a plurality of annular retaining members surrounding the shaft, one located between each adjacent pair of axially spaced tines and one on the outside of the end tines, each of said members having a recess at one end to receive said terminal portion of one tine and retain it against radial or circumferential movement with respect to the member, one of said members being fixed against movement with respect to the shaft, means to clamp the other members and tines in axially stacked relation against said last-mentioned member, and means to prevent rotation of said other members relative to the shaft.

11. A rotary tilling implement including a rotary shaft, a plurality of tilling tines each having a shank provided with a terminal portion curved to wrap at least partially around said shaft, means to fix said tines to said shaft in axially spaced relation to each other including a plurality of annular retaining members surrounding the shaft, one located between each adjacent pair of axially spaced tines and one on the outside of the end tines, each of said members having a recess at each end to receive said terminal portion of the tine adjacent said end and retain it against radial or circumferential movement with respect to the member, one of said members being fixed against movement with respect to the shaft, and means to clamp the other members and tines in axially stacked relation against said last-mentioned member.

12. A rotary tilling implement adapted to be detachably secured to and rotated by a driven shaft comprising a quill adapted to telescope over the shaft and secured thereto against longitudinal movement relative thereto, means providing a shoulder adjacent one end portion of said quill, a cap adjacent the other end portion of said quill and providing a second shoulder spaced longitudinally of said quill from said first-named shoulder, means detachably securing said cap to said quill, a plurality of soil working tines, each said tine having a surface portion conforming in contour to a surface portion of said quill, a first of said tines being positioned adjacent said first-named shoulder, a second of said tines being positioned adjacent said second shoulder, and means including at least one annular spacer telescopically arranged on said quill for spacing the distance between said first and second tines whereby with said cap secured to said quill said first and second tines will be clamped against said respective shoulders.

13. A rotary tilling implement adapted to be detachably secured to and rotated by a driven shaft having a keyway slot opening radially outward of the shaft, comprising a quill adapted to telescope over the shaft and said key slot, said quill being provided with a radially opening key slot extending completely through a wall thereof and adapted to be aligned with said shaft key slot, a key within said quill key slot and adapted to extend into said shaft key slot, an inner cross sectional area of said quill key slot being less than an outer cross sectional area of said key whereby said key is prevented from passing completely through said quill key slot in an inward direction, means adapted to secure said quill to the shaft against undesired longitudinal movement relative thereto, means providing a shoulder adjacent one end portion of said quill, a cap adjacent the other end portion of said quill and providing a second shoulder spaced longitudinally of said quill from said first-named shoulder, means detachably securing said cap to said quill, a plurality of soil working tines, each said tine having a surface portion conforming in contour to a surface portion of said quill, a first of said tines being positioned adjacent said first-named shoulder, a second of said tines being positioned adjacent said second shoulder, and means including at least one annular spacer telescopically arranged on said quill for spacing the distance between said first and second tines whereby with said cap secured to said quill said first and second tines will be clamped against said respective shoulders.

14. The combination of claim 13 in which said annular spacer is positioned at least in part around said key whereby said spacer acts to prevent movement of said key out of said quill key slot.

ARTHUR R. MADILL.

REFERENCES CITED

The following references are of record in the file of this patent:

UNITED STATES PATENTS

| Number | Name | Date |
|---|---|---|
| 1,893,871 | Romera | Jan. 10, 1933 |
| 1,905,384 | Jass | Apr. 25, 1933 |
| 1,944,937 | Kelsey | Jan. 30, 1934 |
| 2,054,129 | Kelsey | Sept. 15, 1936 |
| 2,102,822 | Viau | Dec. 21, 1937 |
| 2,129,298 | Ariens | Sept. 6, 1938 |
| 2,366,624 | Kelsey | Jan. 2, 1944 |
| 2,491,892 | Claus | Dec. 20, 1949 |
| 2,509,343 | Henderson | May 30, 1950 |